United States Patent
Arnold et al.

(10) Patent No.: US 8,788,163 B2
(45) Date of Patent: Jul. 22, 2014

(54) METHOD FOR OPERATING A VEHICLE DRIVE TRAIN

(75) Inventors: Jorg Arnold, Immenstaad (DE); Klaus Steinhauser, Kressbronn (DE); Valentine Herbeth, Friedrichshafen (DE); Christian Popp, Kressbronn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 434 days.

(21) Appl. No.: 13/260,591

(22) PCT Filed: Mar. 31, 2010

(86) PCT No.: PCT/EP2010/054311
§ 371 (c)(1),
(2), (4) Date: Sep. 27, 2011

(87) PCT Pub. No.: WO2010/115806
PCT Pub. Date: Oct. 14, 2010

(65) Prior Publication Data
US 2012/0022752 A1   Jan. 26, 2012

(30) Foreign Application Priority Data

Apr. 6, 2009   (DE) .......................... 10 2009 002 206

(51) Int. Cl.
*G06F 7/00* (2006.01)
*G06G 7/00* (2006.01)

(52) U.S. Cl.
USPC ................................................ 701/54; 701/1

(58) Field of Classification Search
CPC ..... B60W 10/06; B60W 20/00; B60W 10/08; B60W 2710/0666; B60W 30/18
USPC ...................................................... 701/1, 54
See application file for complete search history.

(56) References Cited

U.S. PATENT DOCUMENTS

| | | | |
|---|---|---|---|
| 5,904,068 A | 5/1999 | Genise | |
| 6,385,520 B1 * | 5/2002 | Jain et al. | 701/51 |
| 6,896,641 B2 | 5/2005 | Matsumura et al. | |
| 6,962,549 B2 | 11/2005 | Dreibholz et al. | |
| 7,416,515 B2 | 8/2008 | Iriyama et al. | |
| 2001/0011484 A1 * | 8/2001 | Ruhle et al. | 74/335 |
| 2006/0016282 A1 | 1/2006 | Berger et al. | |

FOREIGN PATENT DOCUMENTS

| | | |
|---|---|---|
| DE | 198 44 783 C1 | 3/2000 |
| DE | 102 44 023 A1 | 4/2004 |
| DE | 60 2005 003 896 T2 | 4/2008 |
| EP | 1 344 965 A2 | 9/2003 |
| WO | 2004/033246 A2 | 4/2004 |

* cited by examiner

*Primary Examiner* — Ian Jen
(74) *Attorney, Agent, or Firm* — Davis & Bujold, PLLC; Michael J. Bujold

(57) ABSTRACT

A method of operating a vehicle drive-train with an engine and a transmission during a gearshift in which an interlocking shift element is disengaged and a frictional shift element is engaged. Upon a shift command, the shifting time and a transmission input speed are monitored. If the input speed deviates from a synchronous speed equivalent to the gear ratio being disengaged, recognizing disengagement of the interlocking shifting element. If an engaged operating condition of the interlocking shifting element to be disengaged is detected, after the lapse of a time interval beginning with the shift command, a current drive torque of the drive machine is brought by motor actuation to a level that corresponds to a difference between the current transmission input torque and a torque that can be transmitted by the frictional shifting element to be engaged, operating with slip, plus a torque offset value.

9 Claims, 4 Drawing Sheets

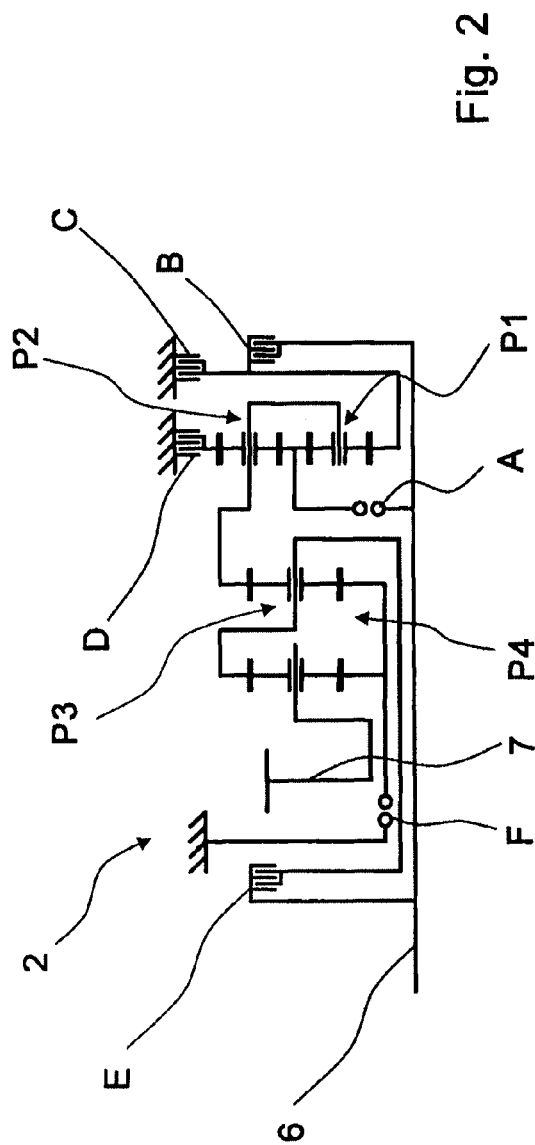

METHOD FOR OPERATING A VEHICLE DRIVE TRAIN

This application is a National Stage completion of PCT/EP2010/054311 filed Mar. 31, 2010, which claims priority from German patent application serial no. 10 2009 002 206.6 filed Apr. 6, 2009.

FIELD OF THE INVENTION

The invention concerns a method for operating a vehicle drive-train with a drive engine and a transmission during a gearshift in the transmission device.

BACKGROUND OF THE INVENTION

In transmission devices known from practice, such as automatic transmissions, frictional shifting elements are increasingly often replaced by interlocking shifting elements in order to reduce the drag losses that occur in the area of frictional shifting elements. In this, however, it is problematic that during unfavorable operating conditions of a vehicle drive-train, an interlocking shifting element that has to be disengaged during a gearshift can still be under stress and it cannot then be disengaged to the desired extent.

For example, such stressing of an interlocking shifting element occurs during gearshifts in which the interlocking shifting element has to be disengaged from the force flow of a vehicle drive-train and at the same time a frictional shifting element has to be engaged in the force flow of the vehicle drive-train in order to produce the new gear ratio called for if, before the interlocking shifting element has had time to reach full disengagement, the frictional shifting element has built up a transmission capacity sufficient to impede the disengagement of the interlocking shifting element.

During such an operating condition sequence of a vehicle drive-train or of a transmission device, the possibility exists that in the area of the transmission device one or more gearsets will be stressed or blocked because of over-regulation, and with conventional procedures this can only be resolved by discontinuing the gearshift, or otherwise it results in un-reproducible shifting times.

Alternatively, stressing of the interlocking shifting element caused by engagement of the frictional shifting element and over-regulation in the area of the transmission device during a gearshift can be avoided by increasing the transmission capacity of the frictional shifting element only once the interlocking shifting element has been disengaged.

EP 1 344 965 A2 shows a method for operating a drive-train of a vehicle with a transmission device the comprises a frictional shifting element and a plurality of interlocking shifting elements. For a gearshift, an interlocking shifting element is disengaged and a frictional shifting element is engaged. If an engaged operating condition of the interlocking shifting element is detected, the after the lapse of a pre-defined time interval the shifting force is increased.

With such a procedure gearshifts can again not be carried out to the desired extent within pre-defined shifting times, so transmission devices can be operated even without reproducible shifting behavior.

SUMMARY OF THE INVENTION

Accordingly, the purpose of the present invention is to provide a method for operating a vehicle drive-train with a drive engine and a transmission device during a gearshift in the transmission device, by means of which gearshifts in which at least one interlocking shifting element has to be disengaged and at least one frictional shifting element has to be engaged can be carried out within pre-defined shifting times and with reproducible shifting behavior.

In the method according to the invention for operating a vehicle drive-train with a drive engine and a transmission device during a gearshift in the transmission device, during which at least one interlocking shifting element is disengaged and at least one frictional shifting element is engaged, at the time of the shift command monitoring of the shifting time and monitoring of a transmission input speed or of a rotational speed equivalent thereto are initiated. If the monitored speed differs from a synchronous speed equivalent to the gear ratio to be disengaged in the transmission device, disengaging of the interlocking shifting element is recognized.

According to the invention, if an engaged operating condition of the interlocking shifting element to be disengaged is detected after the lapse of a pre-defined time interval which begins at the moment of the shift command, a current drive torque of the drive engine is set by means of motor action to a torque level that corresponds to a difference between the actual transmission input torque or a torque value equivalent thereto and a torque value that can be produced by the frictional shifting element to be engaged, operating with slip, plus a torque offset value. Likewise at the time of the shift command the interlocking shifting element to be disengaged changes, at least for a short time, to an at least approximately load-free operating condition. In this case, when a gearshift has been called for and the interlocking shifting element is engaged during traction operation of the vehicle drive-train, the transmission capacity of the frictional shifting element to be engaged is changed to a traction torque value level equivalent to the transmission input torque and if a load change takes place in the vehicle drive-train it is set, preferably abruptly, to a thrust torque value level equivalent to the current transmission input torque. During this the frictional shifting element is operated with slip, at least while the interlocking shifting element is engaged.

By virtue of the procedure according to the invention, a possible stressed condition in the area of the transmission device is resolved with little actuation effort and the interlocking shifting element is brought to and kept in an at least nearly load-free operating condition for a time period sufficient to ensure the certain disengagement of the interlocking shifting element.

In an advantageous variant of the method according to the invention, when a shift command is received while the interlocking shifting element is engaged, the transmission capacity of the frictional shifting element is increased at least approximately to a level that corresponds to the transmission input torque, at which the frictional shifting element is operating with slip. In a simple manner this provides the possibility of being able to carry out the required gearshift with a short shifting time and substantially without interruption of the traction force.

In a further advantageous variant of the method according to the invention, the current transmission input torque is determined from the current torque of the drive engine, without any additional torque sensor.

In a variant of the method according to the invention, if a load change occurs in the vehicle drive-train, the transmission capacity of the frictional shifting element is set to a torque level that preferably corresponds at least approximately to the current transmission input torque and the frictional shifting element is operated with slip, in order to avoid a stressed condition in the area of the transmission device and to be able to carry out the required engagement within a pre-defined shifting time.

To keep to a pre-defined shifting time within which the required gearshift is to be carried out, in a variant of the method according to the invention, the torque offset value is varied as a function of the operating condition of the vehicle drive-train. In this case by varying the torque offset value the gradient of the variation of the torque applied at the interlocking shifting element can be adjusted, and the time when and duration for which the interlocking shifting element is in an at least approximately load-free operating condition can be influenced in an operating condition dependent manner.

In a further variant of the method according to the invention, when a disengaged operating condition of the interlocking shifting element is detected, the frictional shifting element is brought to a fully engaged operating condition.

When a disengaged operating condition of the interlocking shifting element is detected, the motor action can be throttled back in order to bring the vehicle drive-train to the operating condition required as a function of the operating status. This is particularly advantageous when, during downhill driving, the vehicle drive-train is in thrust operation and an engine braking torque has to be exerted at the drive output, which for a time cannot be provided because of the motor action initiated for opening the interlocking shifting element.

BRIEF DESCRIPTION OF THE DRAWINGS

Further advantages and advantageous further developments of the invention emerge from the claims and from the example embodiment whose principle is described below with reference to the drawing, which shows:

FIG. 2: Gearwheel layout of a transmission device with a plurality of frictional shifting elements and interlocking shifting elements for producing various gear ratios;

FIG. 3: Shifting scheme for the transmission device shown in FIG. 1;

DETAILED DESCRIPTION OF THE PREFERRED EMBODIMENTS

Figure 1:
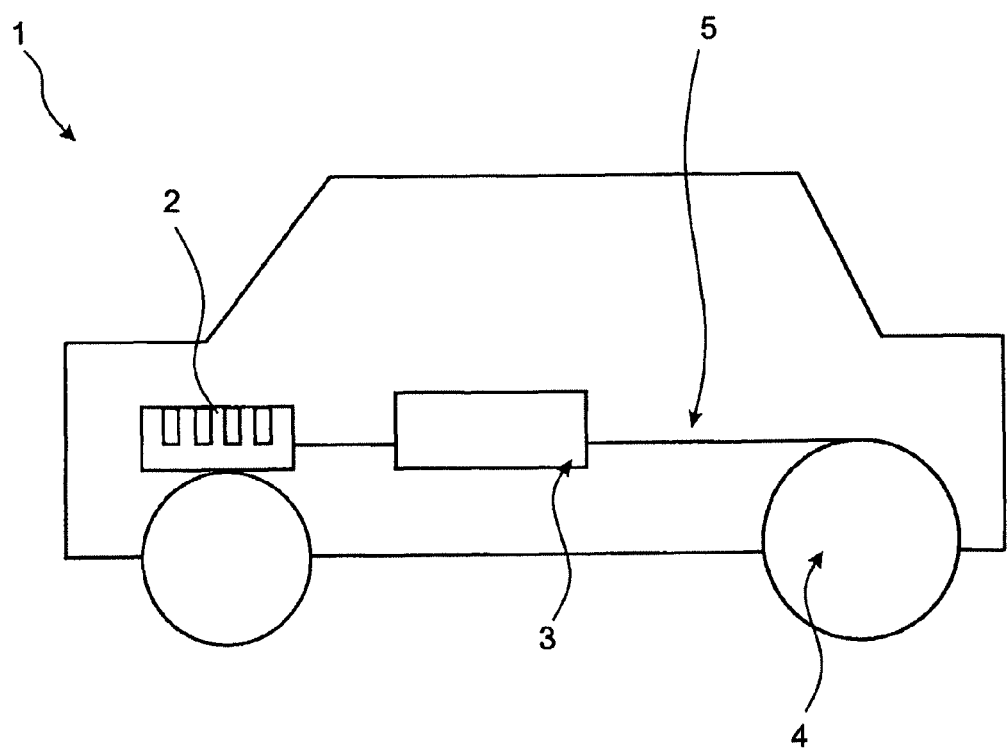
FIG. 1: A very schematic representation of a vehicle with a vehicle drive-train comprising a transmission device and a drive engine.

FIG. 1 shows a very schematic representation of a vehicle 1, which is made with a vehicle drive-train 5 comprising a drive engine 2 in this case in the form of an internal combustion engine, a transmission device 3 designed as an automatic transmission, and a drive output 4. Basically, the transmission device can be any type of automatic transmission known from practice that is made with frictional shifting elements and interlocking shifting elements. In the present case the shifting elements of the transmission device 3 are supplied with hydraulic fluid by a main transmission pump in an operating condition dependent manner, and are shifted by appropriate actuation from a disengaged to an engaged operating condition or from an engaged to a disengaged operating condition, in order to produce an operating condition of the transmission device 3 required at the time.

FIG. 2 shows a gearwheel layout of an example embodiment of the transmission device 3 or a multi-step transmission which, basically, is known from the unpublished German patent application DE 10 2008 000 429.4 by the present applicant. The transmission device 3 comprises a drive input shaft 6 and a drive output shaft 7, which when fitted in the vehicle 1 is connected to the drive output 4 of the vehicle 1 whereas the drive input shaft 6 is functionally connected to a drive engine 2.

Furthermore the transmission device 3 comprises four planetary gearsets P1 to P4, such that the first and second planetary gearsets P1, P2, which are preferably designed as minus planetary gearsets, form a shiftable upstream gearset and the third and fourth planetary gearsets P3, P4 constitute the main gearset. In addition, the transmission device 3 comprises six shifting elements A to F, the shifting elements F, D and C being brakes and the shifting elements A, B and E being shifting clutches.

With the shifting elements A to F, in accordance with the shifting logic shown in FIG. 3 nine forward gears "1" to "9" and one reverse gear "R" can be engaged selectively, in such manner that up to the fourth gear ratio "4", to obtain a gear and produce a force flow in the transmission device 3 in each case three shifting elements at the same time have to be shifted to or kept in an engaged operating condition.

In this case the shifting elements A and F are made as interlocking shifting elements so that during operation of the transmission device 3, compared with transmission devices made only with frictional shifting elements, drag losses caused by disengaged frictional shifting elements are reduced.

The method according to the invention described below is used for gearshifts in which, in each case, at least one interlocking shifting element is disengaged from and at least one frictional shifting element is engaged in the force flow of the transmission device 3. The interlocking shifting elements A and F of the transmission device 3 considered can be designed as claw clutches with or without additional synchronization.

Below, the mode of operation of the method according to the invention is described in more detail, first with reference to the variations with time t of a number of operating condition parameters of the transmission device 3 of FIG. 2, shown in detail in FIG. 4.

Figure 4:
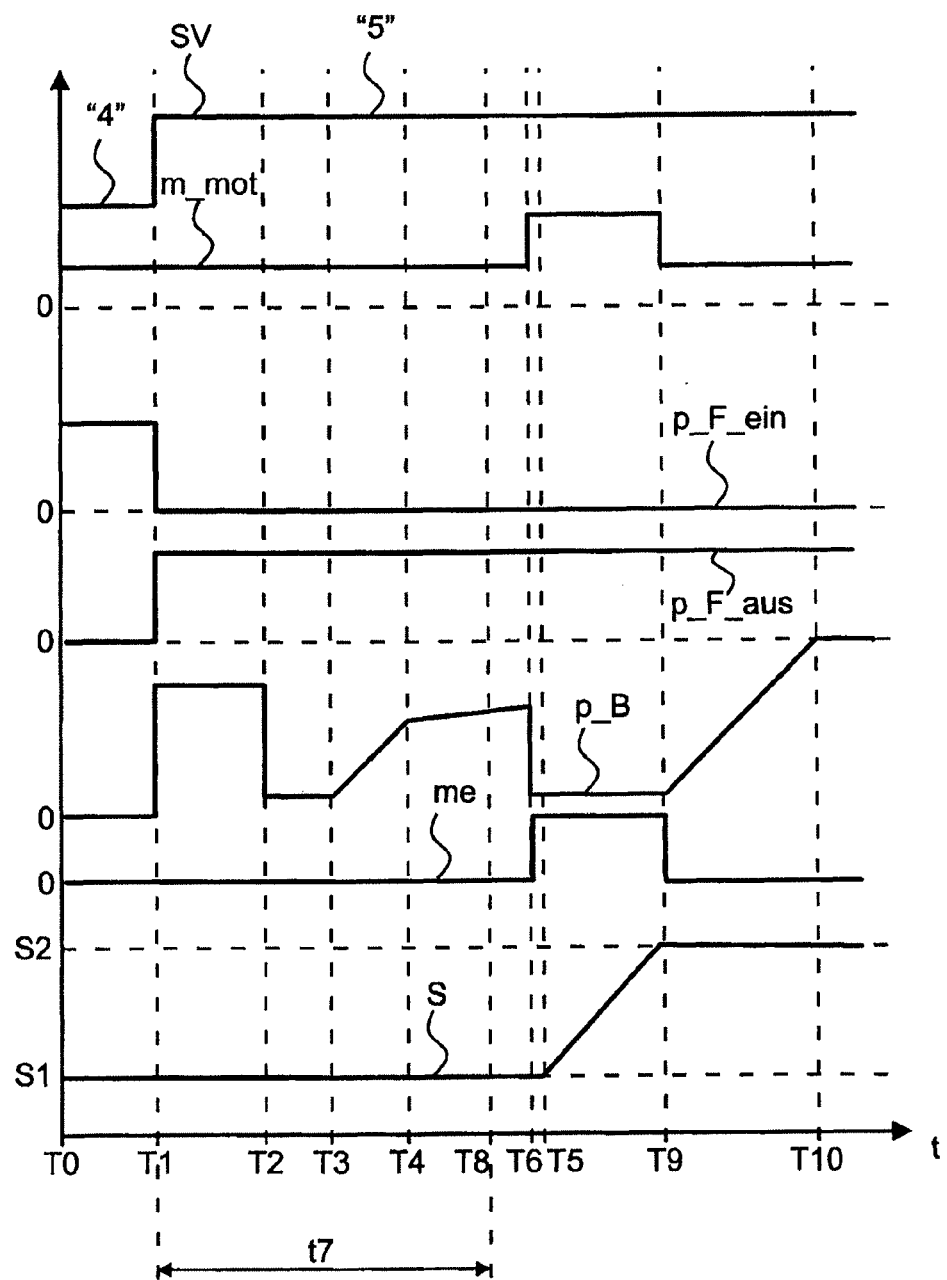
FIG. 4: A number of variations of various operating condition parameters of the transmission device according to FIG. 1 during a traction upshift.

In the case of the operating condition variations of the transmission device 3 shown in FIG. 4, at a time T0 the fourth gear step "4" is engaged in the transmission device 3. To obtain the fourth gear step "4" the shifting elements E and F are kept in the engaged condition, while the shifting elements A to D are disengaged.

At a time T1 a shift command for an upshift from the fourth gear step "4" to the fifth gear step "5" is generated, whereby a shift line SV jumps abruptly from the level of the fourth gear step "4" to the level of the fifth gear step "5".

To carry out the required upshift from the fourth "4" to the fifth gear step "5", the interlocking shifting element F has to be opened and disengaged from the force flow of the transmission device 3 and both the interlocking shifting element A and the frictional shifting element B have to be engaged in the force flow of the transmission device 3, or each changed from the disengaged to the engaged operating condition. Thus, until time T1 the interlocking shifting element F is acted upon by an actuating pressure component p_F_ein that corresponds to the engaging pressure value at which the shifting element F is completely engaged and that acts in the engaging direction of the interlocking shifting element F, while the frictional shifting element B is acted upon by an actuating pressure p_B which is essentially equal to zero. In a manner not explained further, the other interlocking shifting element A is also acted upon until time T1 by an actuating pressure essentially equal to Zero.

At time T1, when the shift command for the upshift from the fourth "4" to the fifth gear step "5" is given, the actuating pressure component p_F_ein that acts in the engaging direction of the interlocking shifting element F is reduced essentially to zero, while another actuating pressure component p_F_aus that acts on the interlocking shifting element F in its disengaging direction is increased from zero essentially to a disengaging pressure level of the interlocking shifting element F.

At the same time, from time point T1 onward the frictional shifting element B is prepared for engagement in the force flow of the vehicle drive-train 5 by a rapid-filling pulse that lasts until a second time T2 followed by a filling compensation phase that lasts until a further time T3, and the interlocking shifting element A is progressively engaged by corresponding actuation. During this, at time T3 the frictional shifting element B is in an operating condition in which, in essence, no torque can yet be transmitted by the frictional shifting element B, but a pressure increase of the actuating pressure p_B starting from the filling compensation pressure level leads to an increase of the transmission capacity of the frictional shifting element B.

To carry out the required upshift in the transmission device 3, from time T3 the actuating pressure p_B is increased from the filling compensation level along a first pressure ramp until a time T4 and, in the present case during traction operation of the vehicle drive-train 5, a torque of the drive engine 2 passing in the direction of the drive output 4 is transmitted to an increasing extent by the frictional shifting element B, while the other fraction of the torque of the drive engine 2 is transmitted by the still engaged interlocking shifting element F.

From time T4, the actuating pressure p_B of the frictional shifting element B is farther increased along a second, flatter pressure ramp that follows on from the first pressure ramp and the transmission capacity of the frictional shifting element p_B continues increasing.

In addition, at the time T1 of the shift command, monitoring of the shifting time t and monitoring of a transmission input speed or of a rotational speed equivalent thereto are initiated. If the monitored speed deviates from a synchronous speed equivalent to the fourth gear "4" to be disengaged in the transmission device 3 by more than a threshold amount, a disengaged operating condition of the interlocking shifting element F is recognized.

If, after the lapse of a pre-defined time interval t7 that extends between time T1 and a time T8, an interlocked connection in the area of the interlocking shifting element F to be disengaged is still detected, then it is confirmed by monitoring the shifting time t that because of a stressed condition of the interlocking shifting element F which opposes disengagement of the interlocking shifting element F to be disengaged, the required gearshift cannot be carried out within a pre-defined shift time as a function of a current operating condition of the vehicle drive-train 5.

If such a monitoring result is obtained, then a current drive torque m_mot of the drive engine is changed at a time T6 by motor action me, and the transmission input torque is brought to a torque level that corresponds to a difference between the current transmission input torque or a torque value equivalent thereto and the torque that can actually be transmitted by the frictional shifting element B to be engaged and now operating with slip, plus a torque offset value, and at which the interlocking shifting element F to be disengaged is in an at least approximately load-free operating condition, at least for a limited time, and there is a high probability of its shifting to its disengaged operating condition.

For this purpose the current transmission input torque is determined on the basis of the actual torque of the drive engine 2 before the motor action. If the vehicle drive-train 5 is made with a hydrodynamic torque converter connected upstream from the transmission input, the motor action me is adapted to the actual design of the vehicle drive-train, for example by computer means.

By virtue of the torque offset value involved in determining the level of the motor action it is ensured that in the area of the interlocking shifting element, at any rate at least for a short time, an at least approximately load-free operating condition exists in which the interlocking shifting element F can be changed to its disengaged operating condition by low shifting forces.

In addition, in this case the actuating pressure of the frictional shifting element B to be engaged is reduced abruptly at time T6 and the stressed condition in the area of the interlocking shifting element F to be disengaged is reduced.

At a time T5 later than time T6 the two shifting element halves of the interlocking shifting element F engaged in one another are moved relative to one another in a direction that disengages the interlocking shifting element F. A shifting path variation S of the interlocking shifting element F to be disengaged between a first shift position S1 of the interlocking shifting element F in which it is fully engaged, and a second shift position S2 in which the interlocking shifting element F is fully disengaged, is also shown in detail in FIG. 4.

In the operating condition variation based on the variations represented in FIG. 4, by virtue of the motor action and the reduction of the transmission capacity of the frictional shifting element B to be engaged, at a time T9 later than the time T5 the interlocking shifting element F to be disengaged is fully disengaged and is in its second shift position S2.

When the disengaged operating condition of the interlocking shifting element F to be disengaged has been detected, the motor action me is discontinued and the torque m_mot of the drive engine 2 is brought to the operating condition dependent level specified by the engine control unit. At the same time the actuating pressure p_B of the frictional shifting element to be engaged is changed, from time T9, along a third pressure ramp that ends at a time T10 within the pre-defined shifting time, to the engaging pressure level at which the frictional shifting element B to be engaged is fully engaged and the required gearshift has been completed.

Figure 5:
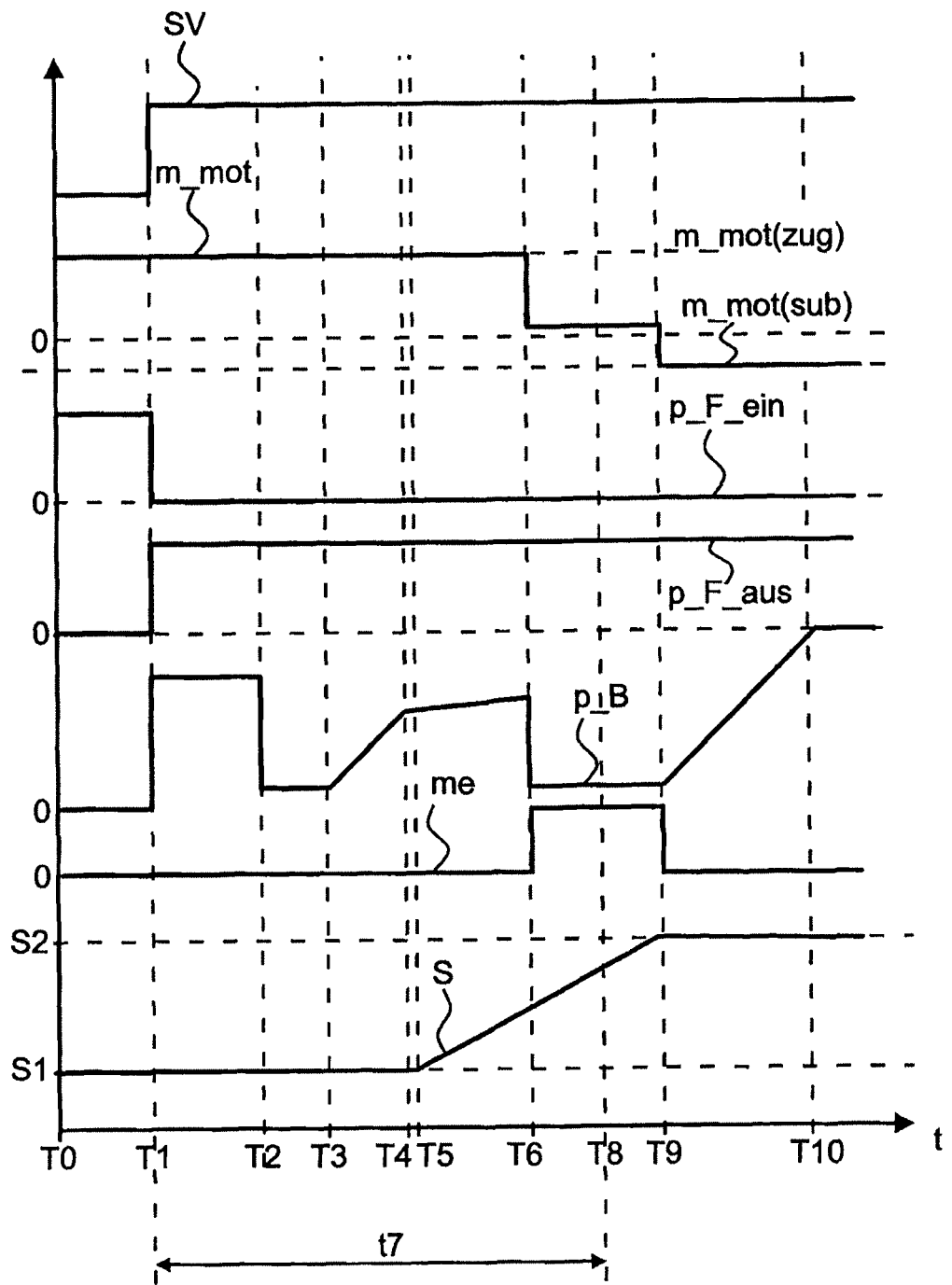
FIG. 5: A number of variations of various operating condition parameters of the transmission device according to FIG. 1 during an upshift with a load change in the vehicle drive-train.

The operating condition variation based on the variations of the vehicle drive-train operating parameters represented in FIG. 5, corresponds essentially to the operating condition variation described by FIG. 4 as far as the time point T6, with the time T5 from which the interlocking shifting element F is disengaged occurring earlier than the time T6. At time T6, for example by virtue of a command expressed by the driver, before the lapse of the time interval t7 a load change takes place in the vehicle drive-train 5 from traction operation to thrust operation of the vehicle, for which reason the drive torque m_mot of the drive engine 2 falls abruptly from a positive traction torque value m_mot(zug) to a negative thrust torque value m_mot(sub).

Since in the present case the traction torque value m_mot(zug) is larger than the thrust torque value m_mot(sub) of the drive torque m_mot of the drive engine 2, in some circumstances the frictional shifting element B operating with slip until the load change will have too high a transmission capacity after the load change at time T6. For that reason the possibility exists that while the interlocking shifting element F is still in its engaged operating condition the frictional shifting element B will change to its engaged operating condition, so that in the transmission device 3 there is an undesirably high stress torque in the area of the interlocked junction of the interlocking shifting element F, such that the interlocking shifting element F cannot be disengaged.

This means that the load change in the vehicle drive-train 5 brings about an operating condition variation which is unfavorable for the disengagement of the interlocking shifting element within a pre-defined shifting time, which must be counteracted already before the lapse of the defined time interval t7.

This results from the fact that to disengage the interlocking shifting element F at the beginning of a required gearshift, the torque to be conveyed via the vehicle drive-train 5 first has to be taken over by the frictional shifting element B to be engaged, in the manner described earlier. For this, between times T1 and T6 the frictional shifting element is acted upon by the actuating pressure p_B or by the actuating force needed for building up its transmission capacity.

While the frictional shifting element B is acted upon by the actuating force required for taking over the load or by the pressure level necessary for this, from time T1 the interlocking shifting element F is actuated in the disengaging direction. Since the load change from traction to thrust operation of the vehicle drive-train 5 takes place at time T6, the sign of the torque to be transmitted in the vehicle drive-train 5 changes from plus to minus.

The connection in the area of the interlocking shifting element F, which is almost free from load until the time T6 of the load change, is loaded again because of the load change in the vehicle drive-train 5. The load in the area of the interlocking shifting element F to be disengaged corresponds to the sum of the thrust torque m_mot (sub) supported in the area of the drive engine 2 or the transmission input torque equivalent thereto, and the torque value that can be transmitted by the frictional shifting element B at the time. Thus, in the area of the interlocking shifting element F to be disengaged there is a stressing torque which impedes the full disengagement of the interlocking shifting element F. Accordingly, the required gearshift cannot be carried out within the pre-defined shifting time. Since in this case the load change in the vehicle drive-train 5 takes place at time T6, which is earlier than time T8, the motor action me described earlier is initiated already at time T6.

At the same time, at time T6 the actuating pressure p_B of the interlocking shifting element B is in this case changed abruptly, i.e. as rapidly as possible, to a torque value that corresponds to the actual transmission input torque so that the frictional shifting element B continues operating with slip and stressing in the area of the transmission device 3 is reliably avoided. To eliminate the load on the interlocking shifting element F to be disengaged still more, in this case positive motor action me to reduce the torque acting at the interlocking shifting element F is initiated, and for that reason the value of the torque m_mot of the drive engine 2 at time T6 is set not to the torque value m_mot(sub) for thrust operation, but to a torque level higher than that.

At time T9 the interlocking shifting element is in its second shift position S2 and is therefore fully disengaged. Accordingly, the motor action me is discontinued again at time T9 and the torque of the drive engine 2 falls to the required thrust torque m_mot(sub).

After the time T9 when the disengaged operating condition of the interlocking shifting element F to be disengaged has been verified, the actuating pressure p_B of the frictional shifting element B to be engaged is increased along the third pressure ramp to its engaging pressure level, reached at time T10, when the frictional shifting element B is fully engaged and the required gearshift has been completed within the pre-defined shifting time.

INDEXES

"1" to "9" Gear ratio for forward driving
A to F Shifting elements
1 Drive output
2 Drive output shaft
3 Drive engine
4 Drive input shaft
5 Vehicle
6 Vehicle drive-train
7 Transmission device
m_mot(sub) Thrust torque value level
m_mot(zug) Traction torque value level
me Motor action
p_B Actuating pressure of the frictional shifting element B
p_F_ein Actuating pressure component of the interlocking shifting element F
p_F_aus Actuating pressure component of the interlocking shifting element F
P1 to P4 Planetary gearset
"R" Gear ratio for reverse driving
S Shifting path variation
S1 First shifting position
S2 Second shifting position
SV Shifting variation
t Time
T0 to T10 Discrete time points
t7 Pre-defined time interval

The invention claimed is:

1. A method of operating a vehicle drive-train (5) which comprises a drive machine (2) and a transmission device (3), and during a gearshift in the transmission device (3) at least one interlocking shifting element (F) is disengaged and at least one frictional shifting element (B) is engaged, the method comprising the steps of:
   initiating monitoring, at a time (T1) of a shift command, of a shifting time and either a transmission input speed or a rotational speed equivalent to the transmission input speed;
   recognizing that the interlocking shifting element (F) is in a disengaged operating condition, if the monitored transmission input speed or the rotational speed equivalent thereto deviates from a synchronous speed equivalent to a gear ratio ("4") to be disengaged in the transmission device (3);
   adjusting a current drive torque (m_mot) of the drive machine (2) if an engaged operating condition of the interlocking shifting element (F) to be disengaged is detected after a lapse of a pre-defined time interval (t7) that begins at the time (T1) of the shift command, by motor actuation (me) to a torque level that corresponds to a difference between either a current transmission input torque or a torque value equivalent thereto and a torque that is transmittable by the frictional shifting element (B) to be engaged, operating with slip, plus a torque offset value, and at which the interlocking shifting element to be disengaged changes, at least for a time, to an at least approximately load-free operating condition such that a transmission capacity of the frictional shifting element (B) to be engaged, during traction operation of the vehicle drive-train (5), is brought to a traction torque value level (m_mot(zug)) equivalent to the transmission input torque;

adjusting the transmission capacity of the frictional shifting element (B) to be engaged, if a load change takes place in the vehicle drive-train (5) during the gearshift, to a thrust torque value level (m_mot(sub)) equivalent to the current transmission input torque; and operating the frictional shifting element (B) with slip at least while the interlocking shifting element (F) is engaged.

2. The method according to claim 1, further comprising the step of increasing the transmission capacity of the frictional shifting element (B), if there is a shift command while the interlocking shifting element (F) is engaged, to a level at least approximately corresponding to the transmission input torque at which the frictional shifting element (B) operates with slip.

3. The method according to claim 1, further comprising the step of determining the current transmission input torque with reference to the current drive torque (m_mot) of the drive machine (2).

4. The method according to claim 1, further comprising the step of setting the transmission capacity of the frictional shifting element (B) to be engaged, if a load change occurs in the vehicle drive-train (5), to a torque value that corresponds at least approximately to the current transmission input torque, and operating the frictional shifting element (B) with slip.

5. The method according to claim 1, further comprising the step of varying the torque offset value, as a function of an operating condition of vehicle drive-train (5), to maintain a pre-defined shifting time within which the required gearshift is to be carried out.

6. The method according to claim 1, further comprising the step of shifting the frictional shifting element (B) to a fully engaged operating condition if the disengaged operating condition of the interlocking shifting element (F) is detected.

7. The method according to claim 1, further comprising the step of discontinuing the motor actuation if the disengaged operating condition of the interlocking shifting element (F) is detected.

8. The method according to claim 7, further comprising the step of changing the current drive torque (m_mot) of the drive machine (2), once the motor actuation (me) ends, to a torque value that corresponds to an actual torque value level specified by an engine control unit.

9. The method according to claim 1, further comprising the step of defining the gearshift as a shift-under-load.

* * * * *